US006065845A

United States Patent [19]

Miyazaki

[11] Patent Number: 6,065,845

[45] Date of Patent: May 23, 2000

[54] LIGHTING DEVICE, LIQUID CRYSTAL DISPLAY DEVICE AND ELECTRONIC EQUIPMENT

[75] Inventor: Kiyomi Miyazaki, Nagano, Japan

[73] Assignee: Seiko Epson Corporation, Japan

[21] Appl. No.: 09/040,002

[22] Filed: Mar. 17, 1998

[30] Foreign Application Priority Data

Mar. 18, 1997 [JP] Japan .................................... 9-065163

[51] Int. Cl.$^{7}$ ..................................................... G01D 11/28

[52] U.S. Cl. .............................. 362/26; 362/27; 362/800; 362/31; 362/335

[58] Field of Search ................................. 362/26, 27, 31, 362/335, 561, 555, 800

[56] References Cited

U.S. PATENT DOCUMENTS 5,479,275 12/1995 Abileah ..................................... 359/48
5,816,677 10/1998 Kurematsu et al. ...................... 362/31

*Primary Examiner*—Sandra O'Shea
*Assistant Examiner*—John A. Ward
*Attorney, Agent, or Firm*—Harness, Dickey & Pierce, P.L.C.

[57] ABSTRACT

A lighting device includes light-emitting diodes 18 for emitting light, a light guide 16 for introducing the light from the light-emitting diodes 18 and emitting the light from a light-emitting surface 16*a*, lenses 21 provided on the end of the light guide 16 opposed to the light-emitting diodes 18. Concerning the curved shape of each lens 21, the size or shape of the curving is set so that light-emitting limits Lb from two adjacent light-emitting diodes 18, 18 intersect on the peripheral line of an effective light-emitting region Ah on the light-emitting surface 16*a*. Accordingly, the effective light-emitting region in the light guide totally emits light at uniform intensity.

19 Claims, 7 Drawing Sheets

EFFECTIVE DISPLAY REGION Av
2
3
17
14
6b
6a
18
21
18
16a
18
1
4
16
EFFECTIVE LIGHT-EMITTING REGION Ah
19

LIGHTING DEVICE, LIQUID CRYSTAL DISPLAY DEVICE AND ELECTRONIC EQUIPMENT

TECHNICAL FIELD

The present invention relates to a lighting device in which a light guide is used. The present invention also relates to a liquid-crystal display device in which the lighting device is used. In addition, the present invention relates to an electronic apparatus in which the liquid-crystal display device is used.

BACKGROUND ART

Recently, liquid-crystal display devices have been widely used as visual information displays for various electronic apparatuses such as portable telephones and video cameras. The liquid-crystal display devices display characters, numerals and other visual information by controlling the orientation of liquid crystals so as to modulate light. In general, the liquid-crystal display devices are fabricated such that driver ICs are mounted on a liquid crystal panel to form a liquid crystal module, and a lighting device, a reflector, etc. are mounted on the liquid crystal module.

A lighting device in which light-emitting diodes are disposed at one end of a light guide so that light from the light-emitting diodes is introduced into the light guide and is two-dimensionally emitted from the light-emitting surface of the light guide is conventionally known as the lighting device mentioned above. According to the conventional lighting device fabricated using the light-emitting diodes and the light guide, it is difficult to obtain emission having a uniform intensity on the whole of the effective light-emitting region of the light guide.

SUMMARY OF THE INVENTION

The present inventor performed various experiments in order to obtain emission having a uniform intensity on the whole light-emitting surface of a light guide. As a result, it is found that there is interdependence between the sizes of lenses provided between light-emitting diodes and the light guide, and the emission intensity. The present invention has been made based on this knowledge, and an object thereof is to cause the whole of the effective light-emitting region of a light guide to emit light having a uniform intensity by adjusting the sizes of lenses provided between light-emitting diodes and the light guide.

In order to achieve the foregoing object, a lighting device according to the present invention is a lighting device including light-emitting diodes for emitting light, a light guide for receiving the light from the light-emitting diodes and emitting the light from a light-emitting surface, and lenses provided on the portion of the light guide opposed to the light-emitting diodes, in which each lens has a curved surface so that light-emitting limits from two adjacent light-emitting diodes intersect on the peripheral line of an effective light-emitting region on the light-emitting surface.

According to the experiments by the present inventor, it is found that the divergence of light travelling from light-emitting diodes in a light guide changes depending on the sizes or curvature of lenses positioned between the light-emitting diodes and the light guide. For example, as shown in FIG. 6, by excessively enlarging lenses 53 between a light guide 51 and light-emitting diodes 52, the neighborhood of one end of the effective light-emitting region Ah of the light guide 51, close to the light-emitting diodes 52, can emit bright light. However, the neighborhood of another end of the effective light-emitting region Ah, far from the light-emitting diodes 52, is dark. Thus, uniform emission cannot be obtained on the whole of the effective light-emitting region Ah. This reason is as follows: Excessive enlargement of the lenses 53 excessively enlarges the divergent region of light diverging through the lenses 53, which causes the light-emitting limits Lb of two adjacent light-emitting diodes 52, 52 to intersect outside the peripheral line of the effective light-emitting region Ah. Thus, light having sufficient intensity can be guided to the end of the effective light-emitting region Ah, close to the light-emitting diodes 52, but cannot be guided to the other end of the effective light-emitting region Ah, far from the light-emitting diodes 52.

In addition, as shown in FIG. 7, by excessively reducing the sizes of lenses 53, the neighborhood of one end of an effective light-emitting region Ah, far from light-emitting diodes 52, can emit bright light. However, the neighborhood of another end close to the light-emitting diodes 52 is dark. Thus, uniform emission cannot be obtained from the whole of the effective light-emitting region Ah. This reason is as follows: Excessively reducing the sizes of the lenses 53 extremely decreases the divergent range of light diverging from the lenses 53, which causes the light-emitting limits Lb of two adjacent light-emitting diodes 52, 52 to intersect inside the peripheral line of the effective light-emitting region Ah. Thus, light having sufficient intensity cannot be guided to one side of the effective light-emitting region Ah, close to the light-emitting diodes 52.

Conversely, as shown in FIG. 3, by setting the curved surfaces of lenses 21 so that the light-emitting limits from two adjacent light-emitting diodes 18, 18 can intersect on the peripheral line of an effective light-emitting region Ah of a light-emitting surface 1*a*, light having sufficient intensity can be guided to both one end portion of the effective light-emitting region Ah close to the light-emitting diodes 18 and another end portion far from it. Accordingly, the effective light-emitting region Ah of a light guide 1 can totally emit light at uniform intensity.

In the above structure, on the condition that the light-emitting limits Lb from the adjacent light-emitting diodes 18, 18 intersect on the peripheral line of the effective light-emitting region Ah of a light-emitting surface 16, the shapes of the curved surfaces of the lenses 21 may be formed in the shape of an arc, an oval, an ellipse, or another arbitrary shape. However, in order to facilitate the adjustment of each extent of the light-emitting diodes Lb, it is preferable to form the curved surfaces of the lenses 21 in the shape of an arc.

Next, a liquid-crystal display device according to the present invention is a liquid-crystal display device including a liquid crystal panel and a lighting device mounted on the liquid crystal panel, in which the lighting device includes a light guide for receiving the light from the light-emitting diodes and emitting the light from a light-emitting surface, and lenses provided on the portion of the light guide opposed to the light-emitting diodes. Each lens has a curved surface so that light-emitting limits from two adjacent light-emitting diodes intersect on the peripheral line of an effective light-emitting region on the light-emitting surface.

In general, the effective display region of a liquid crystal panel is defined as a region included in the effective light-emitting region of a light guide so as to have a size slightly smaller than the effective light-emitting region of the liquid crystal panel. A liquid-crystal display device according to the present invention can provide a uniform emission intensity on the whole of the effective light-emitting region or its light guide, so that the effective display region of the liquid crystal panel can obtain a total display having uniform brightness.

In addition, an electronic apparatus according to the present invention is formed including the liquid-crystal display device according to the present invention. Specifically, this electronic apparatus includes at least a liquid-crystal display device, a power-supply unit for supplying power to the liquid-crystal display device, and a controller for controlling the operation of the liquid-crystal display device. Examples of this electronic apparatus include a portable telephone, a video camera, and another type of electronic apparatus.

DETAILED DESCRIPTION OF THE PREFERRED EMBODIMENTS

Figure 1:
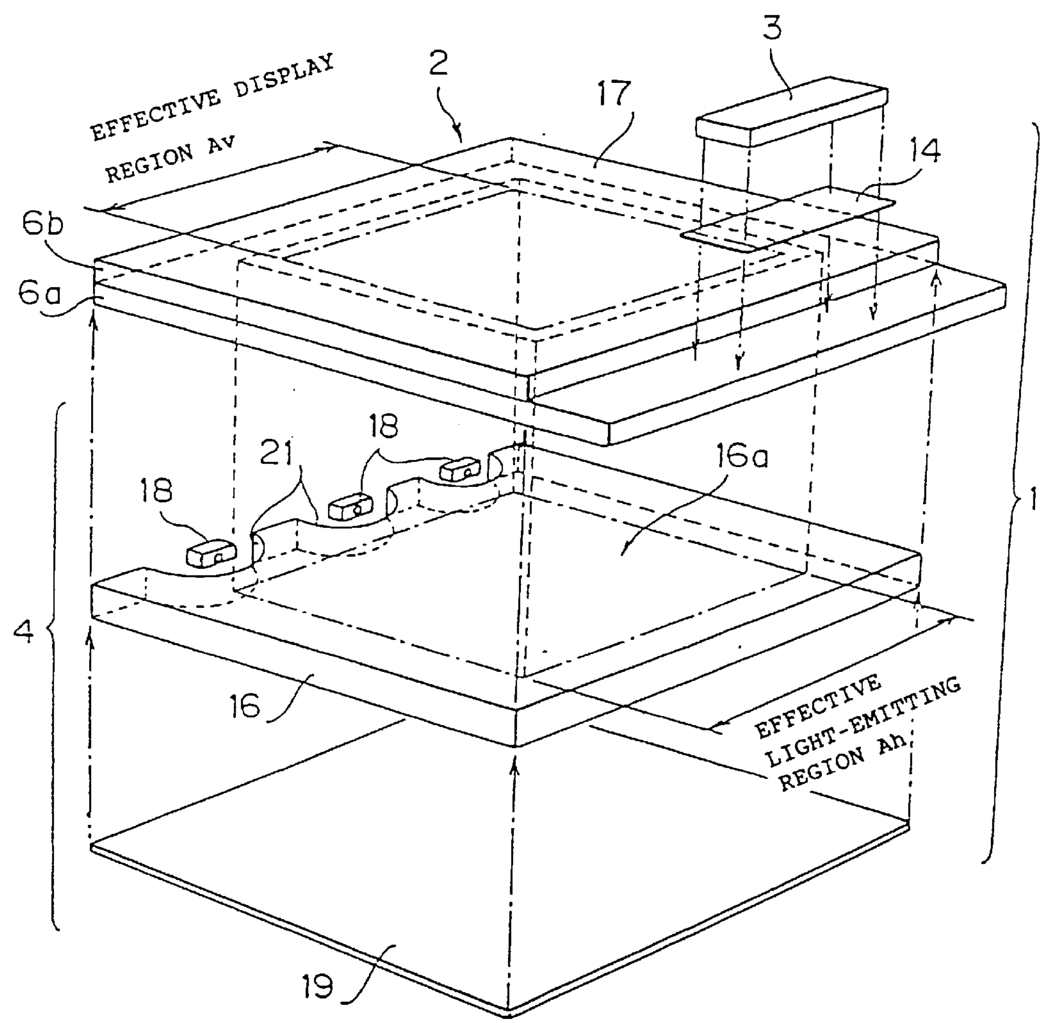
FIG. 1 is an exploded perspective view showing a lighting device and a liquid-crystal display device according to embodiments of the present invention.
Figure 2:
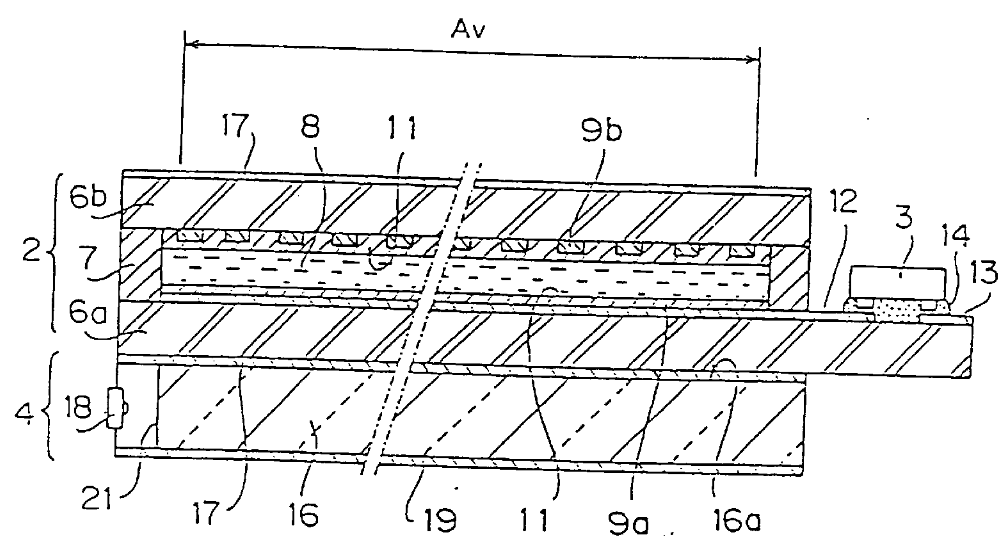
FIG. 2 is a section view showing the sectional structure of the liquid-crystal display device in FIG. 1.

FIG. 1 shows one embodiment of a lighting device and one embodiment of a liquid-crystal display device according to the present invention. A liquid-crystal display device 1 shown therein is formed by mounting a driver IC 3 and a lighting device 4 on a liquid crystal panel 2. The liquid crystal panel 2 has a pair of transparent substrates 6*a* and 6*b* mutually opposed, as shown in FIG. 2.

On one transparent substrate 6*a* are formed transparent electrodes 9*a* composed of indium tin oxide (ITO). The transparent electrodes 9*a* include at least stripe electrodes in which a plurality of linear electrodes are arranged to be parallel to each other, and may further include pattern electrodes having an appropriate shape. On the transparent electrodes 9*a* is formed an alignment film 11, and the alignment film is aligned, for example, by rubbing.

On the other transparent substrate 6*b* are formed transparent electrodes 9*b* composed of ITO. The transparent electrodes 9*b* include at least stripe electrodes, and may further include pattern electrodes. On the transparent electrodes 9*b*, an alignment film 11 is also formed, and it is aligned.

The transparent substrates 6*a* and 6*b* are laid on each other so that the transparent electrodes 9*a* and 9*b* are opposed, and in particular, both stripe electrodes are orthogonally positioned. They are bonded to each other with sealing material so that an appropriate gap, namely a cell gap, is formed. Subsequently, liquid crystal 8 is encapsulated in the cell gap. In addition, polarizers 17 are bonded to the exterior surfaces of the transparent substrates 6*a* and 6*b*.

One transparent substrate 6*a* extends farther outside than the other transparent substrate 6*b*, and a connecting conductive terminal 12 is formed on the extended portion. The connecting conductive terminal 12 is composed of a terminal integrated with the transparent electrodes 9*a*, and a terminal connected to the transparent electrodes 9*b* on the other transparent substrate 6*b*, with conductive material (not shown) provided between the transparent substrate 6*a* and the transparent substrate 6*b*. At one end of the extended portion of the transparent substrate 6*a* is formed an external connecting conductive terminal 13.

When the driver IC 3 is mounted on the liquid crystal panel 2 formed in the above manner, as shown in FIG. 2, by causing the projecting electrodes or so-called "bumps" of the driver IC 3 to touch both the connecting conductive terminal 12 and the external connecting conductive terminal 13, and subsequently applying pressure on the driver IC 3 while heating it, the driver IC 3 is bonded to the transparent substrate 6*a*.

In this embodiment, the lighting device 4 is bonded to the external surface of one transparent substrate 6*a* by using a double coated tape or another bonding means. The lighting device 4 includes a plane light guide 16, a plurality of, for example, three light-emitting diodes 18 fixed at one end of the light guide 16, and a light reflector 19 bonded to the opposite side of the surface 16*a* of the light guide 16 opposite to the light-emitting surface. A proper light-diffusion pattern may be formed on the light-emitting surface 16*a*. The light guide 16 is composed of, for example, polycarbonate, acrylic resin, and so forth.

Figure 3:
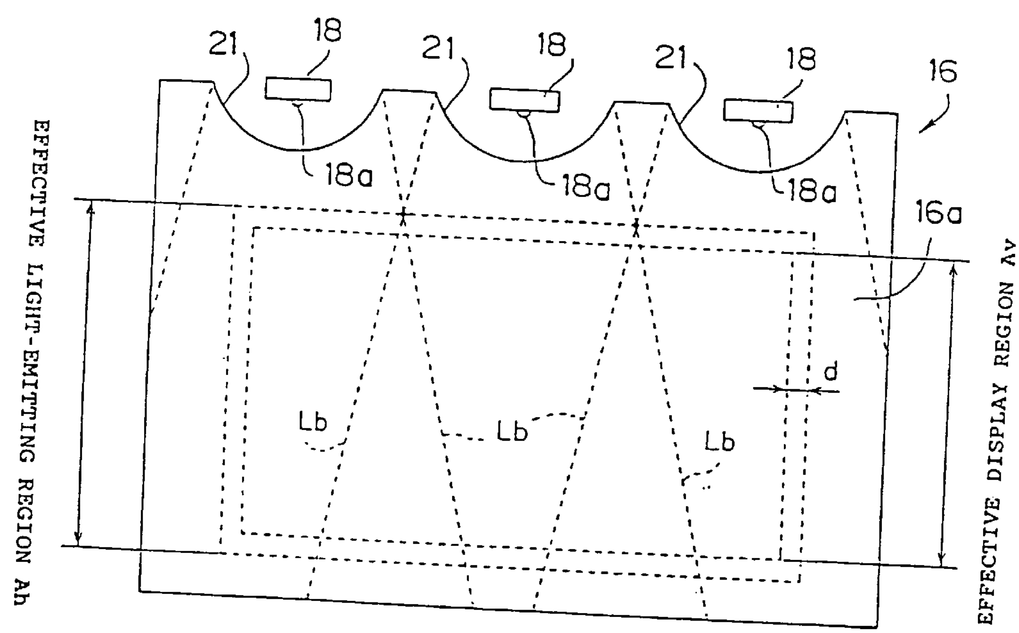
FIG. 3 is a plan view showing a lighting device according to one embodiment of the present invention.

As shown in FIG. 3, one end of the light guide 16, opposed to the light-emitting diodes 18, is formed to have curves, for example, arcs, and the curved surfaces operate as lenses 21. The lenses 21 are used to cause rays emitted from the light emitting points 18*a* of the light-emitting diodes 18 to diverge. Reference mark Lb in the figure denotes a light-emitting limit. This light-emitting limit is defined as a line in which the intensity of light changes extremely before and after the limit. According to this embodiment, the size and curvature of each lens 21 are set so that light-emitting limits Lb from two adjacent light-emitting diodes 18, 18 intersect on the peripheral line of the effective light-emitting region Ah on the light-emitting surface 16*a*.

Concerning the liquid crystal panel 2 in FIG. 2, an effective display region Av for displaying a visual image is defined on the surface opposed to the lighting device 4. According to this embodiment, as shown in FIG. 3, the effective display region Av of the liquid crystal panel 2 is formed as a region narrower than the effective light-emitting region Ah of the light guide 16, for example, a region being narrower by dimension d of approximately 0.3 mm. The lighting device and the liquid-crystal display device according to these embodiments have the above structures. Thus, in FIG. 2, when the light-emitting diode 18 is supplied with a current to emit a ray, the ray is introduced into the light guide 16. The ray is further reflected by the light reflector 19 before being guided to the light-emitting surface 16*a*, and is emitted from the light-emitting surface 16*a* to the outside.

During the above light emission, appropriate electrodes among the transparent electrodes 9*a* and 9*b* in the liquid crystal panel 2 are selected by the driver IC 3, and a voltage is applied to the selected electrodes, whereby the orientation of the liquid crystal portions corresponding to the selected electrodes changes from its initial condition. In the above manner, the ray emitted from the lighting device 4 is modulated in accordance with the change in the orientation of the liquid crystal, so that, in the effective display region Av, it can be recognized as visual information through the polarizer 17.

According to this embodiment, as shown in FIG. 3, the light-emitting limits Lb from the adjacent light-emitting diodes 18, 18 intersect on the peripheral line of the effective light-emitting region Ah on the light-emitting surface 16*a*. Thus, light having sufficient intensity can be guided to the end portion of the effective light-emitting region Ah close to the light-emitting diodes 18, and light having intensity as strong as possible can be guided to the other end portion far from the light-emitting diodes 18. Thus, light emission having a uniform intensity can be obtained in the whole of the effective light-emitting region Ah. Since the whole of the effective light-emitting region Ah emits light at uniform intensity, the effective display region Av of the liquid crystal panel 2, narrower than the effective light-emitting region Ah, can display a total visual image having uniform brightness.

Figure 4:
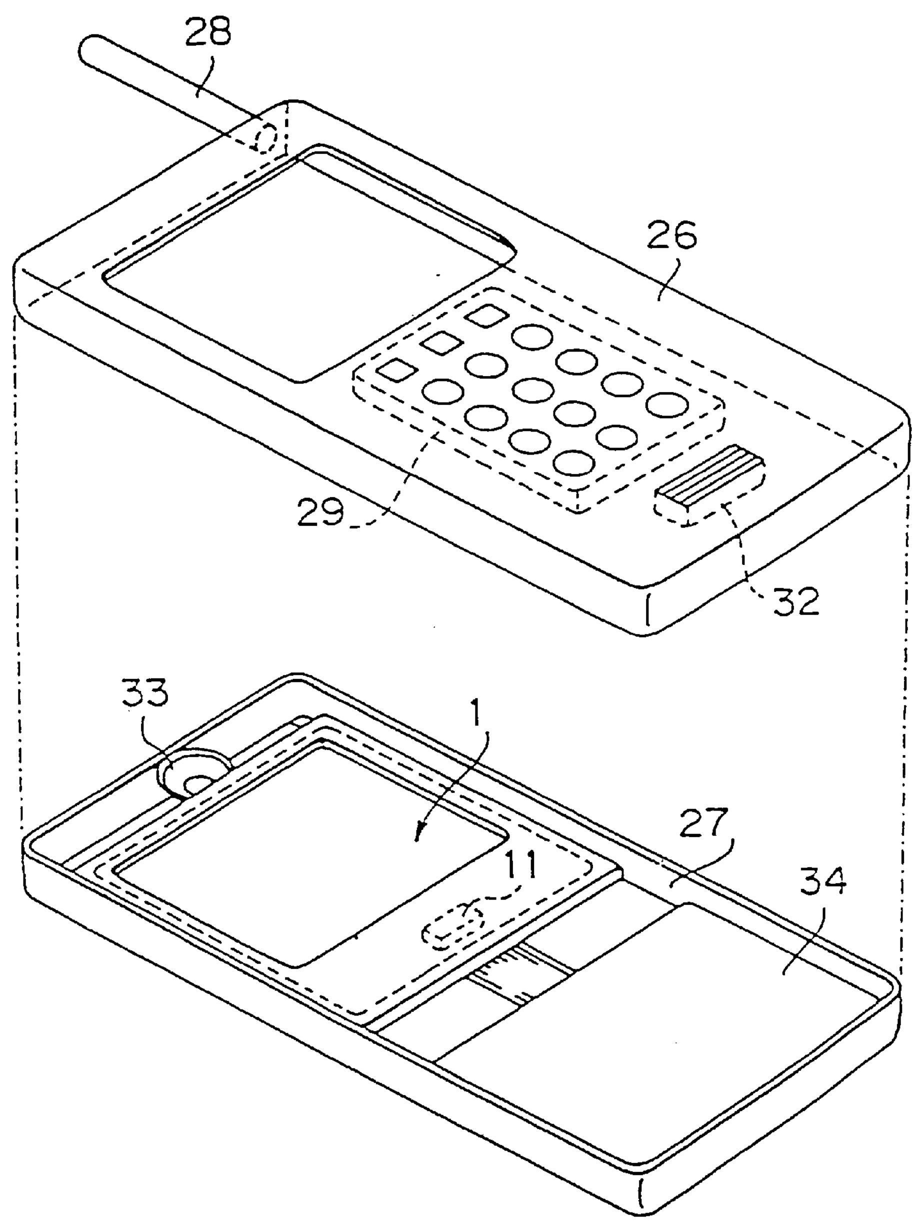
FIG. 4 is an exploded perspective view showing an electronic apparatus according to one embodiment of the present invention.

FIG. 4 shows an embodiment obtained when a liquid-crystal display device according to the present invention is used as a display unit for a portable telephone as an electronic apparatus. The portable telephone shown therein includes a top case 26 and a bottom case 27. The top case is provided with a transmitting/receiving antenna 28, a keyboard 29, and a microphone 32. The bottom case 27 is provided with, for example, the liquid-crystal display device 1 shown in FIG. 1, a speaker 33, and a circuit substrate 34.

Figure 5:
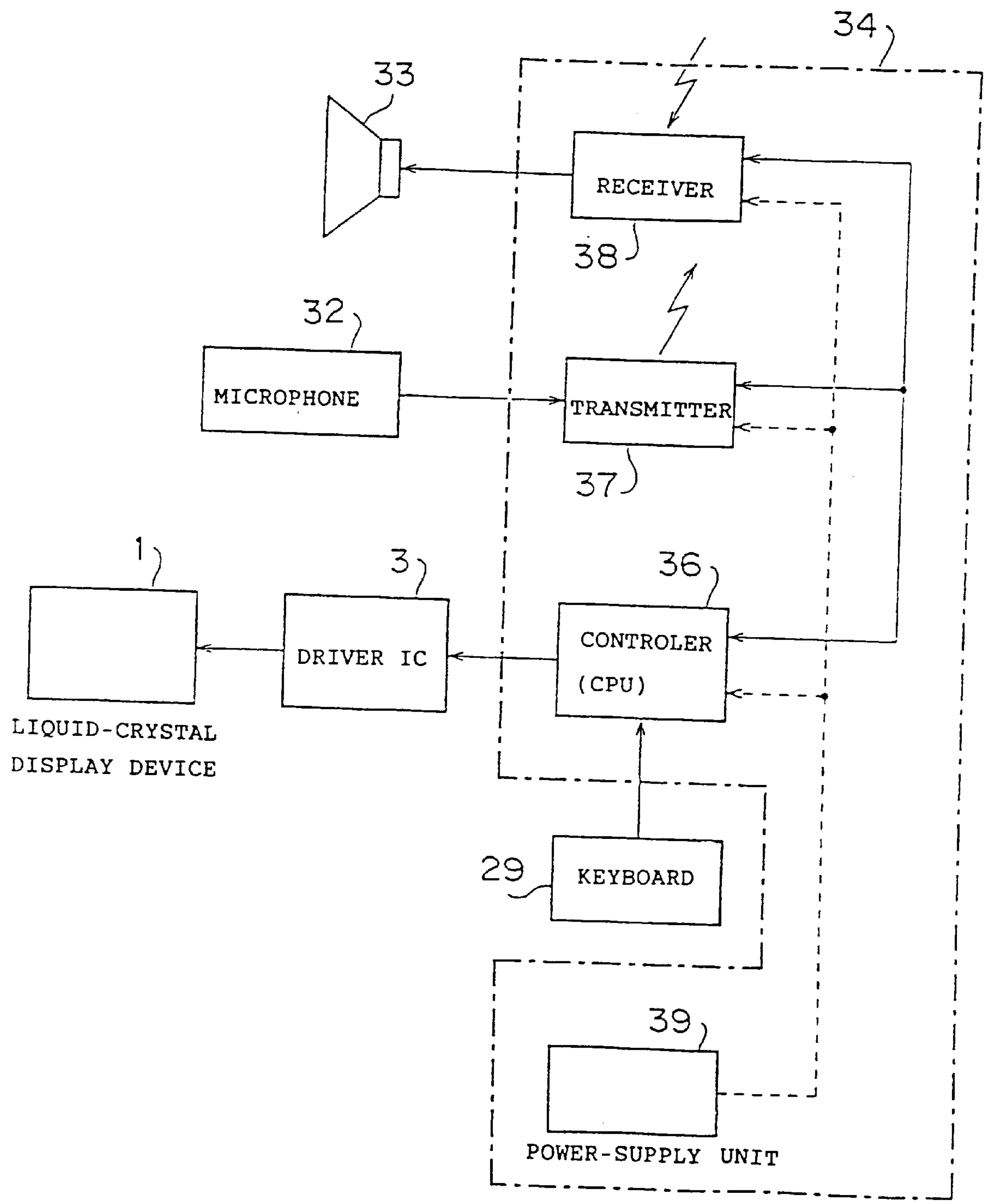
FIG. 5 is a block diagram showing one embodiment of an electrical control system used in the electronic apparatus in FIG. 4.
Figure 6:
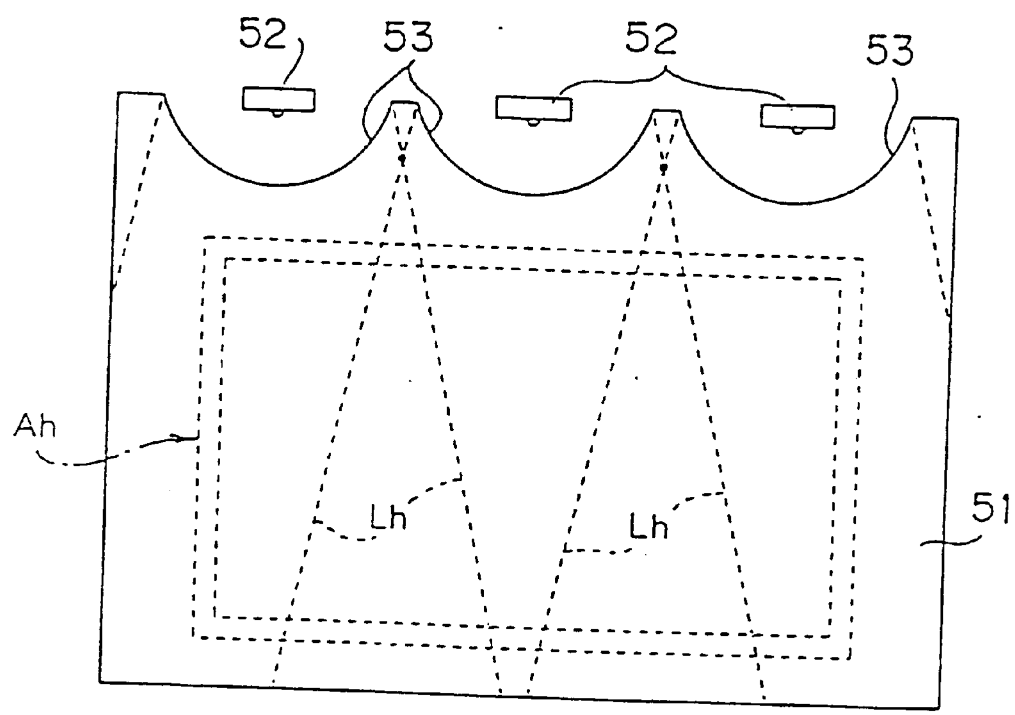
FIG. 6 is a plan view showing a comparative example of a lighting device.
Figure 7:
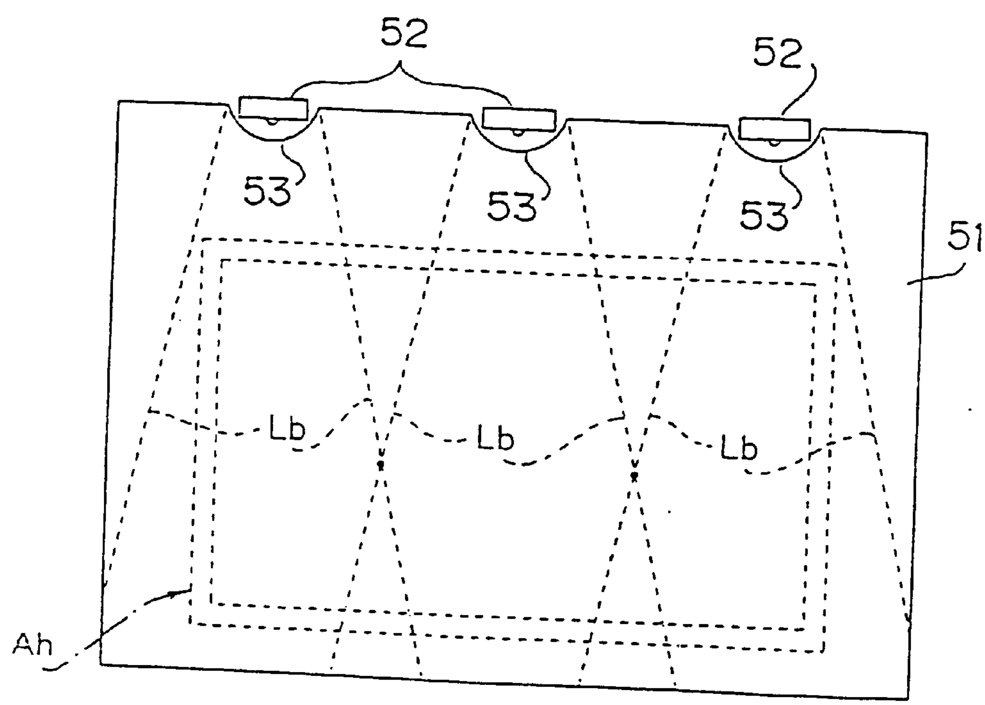
FIG. 7 is a plan view showing another comparative example of a lighting device.

On the circuit substrate 34, as shown in FIG. 5, there are provided a receiver 38 connected to the input terminal of the speaker 33, a transmitter 37 connected to the output terminal of the microphone 32, a controller 36 including a CPU, and a power-supply unit 39 for supplying power to each unit. The controller 36 reads the conditions of the transmitter 37 and the receiver 38, and it supplies information to the driver IC 3, based on the results, whereby displaying visual information in the effective display region of the liquid-crystal display device 1. The controller 36 also supplies information to the driver IC 3, based on information output from the keyboard unit 29, whereby displaying visual information in the effective display region of the liquid-crystal display device 1.

The present invention has been described with reference to the preferred embodiments. However, the present invention is not limited to the embodiments, but may be variously modified within the scope of the inventions set forth in the Claims.

For example, concerning the lighting device illustrated in FIG. 3, although the number of light-emitting diodes in the embodiment shown in FIG. 3 is set at three, it may be set at a different arbitrary number. Also, in FIG. 3, the curved shape of each lens 21 is an arc. Instead, it may be oval, elliptical, or another arbitrary shape.

In addition, the embodiment shown in FIG. 1 and FIG. 2 has illustrated the case that a chip-on-glass (COG) type of liquid crystal panel is used. However, it need hardly be said that the present invention may be applied to a type of liquid crystal panel using a tape carrier package (TCP) formed in accordance with tape automated boding (TCP) techniques, and to any other types of liquid crystal panels.

Moreover, the embodiment shown in FIG. 4 has illustrated the case that the liquid-crystal display device of the present invention is applied to the visual-information display unit of a portable telephone. However, it need hardly be said that the liquid-crystal display device of the present invention may be applied to an arbitrary electronic apparatus other than the portable telephone, for example, a display unit for a video camera, and so forth.

According to the lighting device of the present invention, light-emitting limits from two adjacent light-emitting diodes intersect on the peripheral line of an effective light-emitting region on a light-emitting surface. Thus, light having sufficient intensity can be guided to the end portion of the effective light-emitting region, closer to the light-emitting diodes, which causes the effective light-emitting region in a light guide to totally emit light at uniform intensity.

Forming the curved surface of each lens in the shape of an arc facilitates adjustment of the distribution of light-emitting limits from the lens.

In addition, according to the liquid-crystal display device and the electronic apparatus of the present invention, light emission having a uniform intensity can be obtained from the whole of an effective light-emitting region in a lighting device. Thus, the effective display region of a liquid crystal panel can totally display visual information having uniform brightness.

What is claimed is:

1. A lighting device including light-emitting diodes for emitting light, a light guide for receiving the light from the light-emitting diodes and guiding the light therefore a light-emitting surface, and lenses provided on a portion of said light guide opposed to said light-emitting diodes, in which each lens has a curved surface so that light-emitting limits from two adjacent light-emitting diodes intersect on a boundary of an effective light-emitting region of the light-emitting surface.

2. A lighting device as set forth in claim 1, wherein the curved surface of each lens has a shape of an arc.

3. A liquid-crystal display device having a liquid crystal panel and a lighting device mounted on said liquid crystal panel, in which said lighting device includes light-emitting diodes for emitting light, a light guide for receiving the light from the light-emitting diodes and emitting the light from a light-emitting surface, and lenses provided on a portion of said light guide opposed to said light-emitting diodes, and each lens has a curved surface so that light-emitting limits from two adjacent light-emitting diodes intersect on a boundary of an effective light-emitting region of the light-emitting surface.

4. An electronic apparatus including a liquid-crystal display device as set forth in claim 3, a power-supply unit for supplying power to said liquid-crystal display device, and a controller for controlling a operation of said liquid-crystal display device.

5. A lighting device comprising:

a plurality of light emitting diodes for emitting light;

a light guide having a light receiving end proximate said light emitting diodes for receiving said light and light emitting surface for emitting said light; and a plurality of lenses provided on said light receiving end of said light guide and each of said plurality of lenses directing said light in a respective preselected pattern, each of said patterns including limits marking a change of intensity of said light, each of said lenses being shaped such that light from adjacent ones of light emitting diodes intersects along limits of respective patterns at a boundary of an effective light-emitting region of said light emitting surface of said light guide.

6. The lighting device of claim 5 wherein each of said lenses is shaped in an arc.

7. A liquid crystal display device comprising:

a liquid crystal panel including an effective display region for displaying images;

a plurality of light emitting diodes for emitting light;

a light guide having a light receiving end proximate said light emitting diodes for receiving said light and a light emitting surface for emitting said light towards said liquid crystal panel;

a plurality of lenses provided on said light receiving end of said light guide and each of said plurality of lenses directing said light in a respective preselected pattern, each of said patterns including limits marking a change of intensity of said light; and each of said lenses being shaped such that light from adjacent ones of said light emitting diodes intersects along said limits at a boundary of an effective light-emitting region of said light emitting surface of said light guide, said effective display region being narrower than said effective light-emitting region.

8. A liquid crystal display device of claim 7 wherein each of said lenses are shaped in arc.

9. A liquid crystal display device of claim 7 wherein said lenses comprise curves formed in said light receiving end.

10. A liquid crystal display device of claim 7 further comprising a light reflector positioned opposite to said light emitting surface of said light guide.

11. A liquid crystal display device of claim 7 further comprising a driver IC mounted on said liquid crystal panel.

12. A liquid crystal display device comprising:

a liquid crystal panel including an effective display region for displaying images;

a plurality of light emitting diodes for emitting light;

a light guide having a light receiving end oppose to said light emitting diodes for receiving said light and a light emitting surface for emitting said light towards said liquid crystal panel; and a plurality of lenses provided on said light receiving end of said light guide and each of said plurality of lenses directing said light in a respective predetermined area defined by a change of intensity of said light;

each of said lenses being shaped such that light from adjacent ones of said light emitting diodes intersects proximate a boundary of said effective display region.

13. A liquid crystal display device of claim 12 characterized in that said light from adjacent ones of said light emitting diodes intersects outside of said boundary of said effective display region.

14. A liquid crystal display device of claim 12 wherein each of said lenses are shaped in arc.

15. A liquid crystal display device of claim 12 wherein said lenses comprise curves formed in said light receiving end.

16. A liquid crystal display device of claim 12 further comprising a light reflector positioned opposite to said light emitting surface of said light guide.

17. A liquid crystal display device of claim 12 further comprising a driver IC mounted on said liquid crystal panel.

18. An electronic apparatus including a liquid crystal display device comprising:

a power-supply unit for supplying power to said liquid crystal display device;

a controller for controlling the operation of said liquid crystal display device;

a liquid crystal panel including an effective display region for displaying images;

a plurality of light emitting diodes for emitting light; and a light guide having a light receiving end oppose to said light emitting diodes for receiving said light and a light emitting surface for emitting said light towards said liquid crystal panel;

each of said lenses being shaped such that light from adjacent ones of said light emitting diodes intersects proximate a boundary of said effective display region.

19. A liquid crystal display device of claim 18 characterized in that said light from adjacent ones of said light emitting diodes intersects outside of said boundary of said effective display region.

* * * * *